United States Patent [19]

Kurzweil

[11] 3,966,039

[45] June 29, 1976

[54] METHODS AND APPARATUS FOR CONTINUALLY DELIVERING WIRE CLOSURE ELEMENTS

[75] Inventor: Lubor Kurzweil, Landeck-Kondringen, Germany

[73] Assignee: Firma Otto Sick K.G., Germany

[22] Filed: Jan. 29, 1975

[21] Appl. No.: 545,150

[30] Foreign Application Priority Data

Feb. 4, 1974 Germany ............................ 2405191

[52] U.S. Cl. ...................................... 198/21; 198/26; 198/38; 53/69

[51] Int. Cl.[2] .......................................... B65G 47/42

[58] Field of Search ................... 198/21, 26, 34, 41, 198/218, 106, 38; 221/211, 212, 216, 299; 214/1 BT, 8.5 D, 11 R; 271/10, 18.1, 18.2; 53/67, 69

[56] References Cited

UNITED STATES PATENTS

| | | | |
|---|---|---|---|
| 2,192,503 | 3/1940 | Newman | 198/26 |
| 2,417,938 | 3/1947 | Krueger | 221/211 |
| 2,558,633 | 6/1951 | Tuttle | 198/26 |
| 2,586,281 | 2/1952 | Wilson | 221/211 |
| 2,766,869 | 10/1956 | Bauman | 198/26 |
| 3,118,218 | 1/1964 | Gleason et al. | 221/212 |
| 3,794,212 | 2/1974 | Check | 221/212 |
| 3,799,318 | 3/1974 | Dekoekkoek | 198/26 |

*Primary Examiner*—John J. Love
*Assistant Examiner*—Joseph E. Valenza
*Attorney, Agent, or Firm*—Burns, Doane, Swecker & Mathis

[57] ABSTRACT

A depositing mechanism deposits wire bottle closure elements sequentially onto a conveyor. The conveyor transports a continuous supply of closure elements to a bottle wiring station. Closure elements which are not utilized at the wiring station return on the conveyor to the depositing station. To avoid duplication of closure elements on the conveyor a sensing system scans the conveyor at a sensing station located ahead of the depositing station. If no closure element is detected the depositing operation proceeds as usual. If a closure element is detected, the depositing operation is interrupted. The depositing mechanism includes a magnetic transfer device for transferring closure elements onto the conveyor and which is particularly suited to high-speed operation.

2 Claims, 3 Drawing Figures

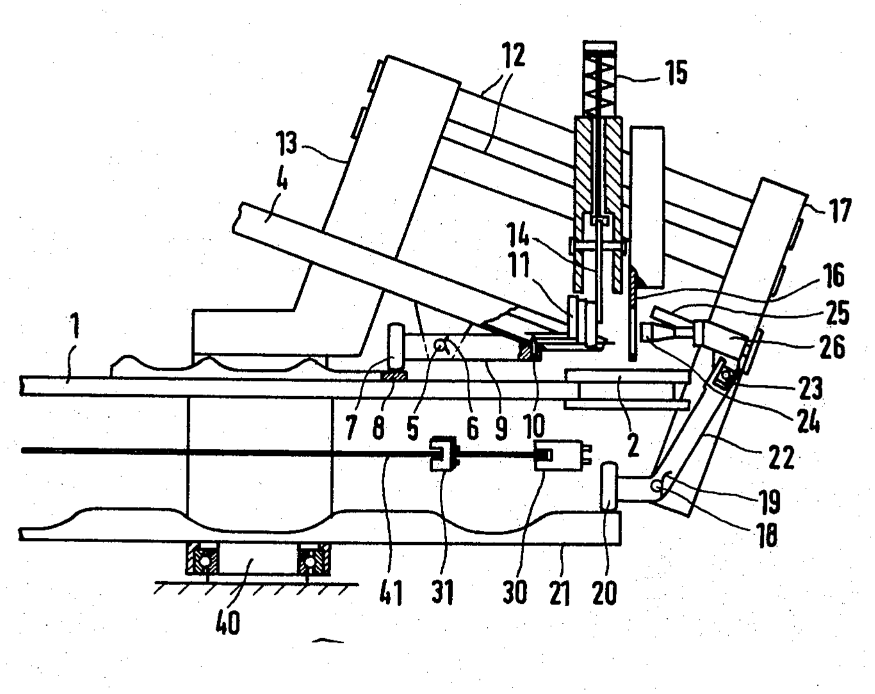

METHODS AND APPARATUS FOR CONTINUALLY DELIVERING WIRE CLOSURE ELEMENTS

BACKGROUND AND OBJECTS OF THE INVENTION

The invention relates to the feeding of bottle closure members, and especially concerns the feeding of wire-like closure elements toward a machine which installs such closure elements onto champagne bottles. Still more particularly, the invention concerns methods and apparatus for the individual feeding-in, without interruption, of wire closures from a locally fixed magazine. The closures are supplied by the magazine and are lined up in rows. The closures are delivered to a wiring machine for champagne bottles in the rythm of the wiring by way of an endless intermediate conveying member having receivers. As will be discussed, the transfer of the closures from the magazine to the intermediate conveying member is controlled, contingent on the acceptance of closure members at the place of wiring.

Previous techniques for feeding closure members to a wiring machine have been employed in the past. These techniques generally operate according to a principle wherein a wire closure is taken from a magazine and placed on a conveyor receiver only whenever a bottle reaches the intake of the wiring machine and triggers a mechanical or pneumatic signal. Constructively conditional, the place for scanning the bottle is relatively far away from the place of putting the closure member onto the conveyor, which gives rise to various difficulties the higher the output of the installation becomes. Thus, in case of large and fast running installations, it will be almost impossible to establish a synchronization between the scanning of the bottles at the wiring machine inlet and the removal of wire closures from the magazine. This is so because of the large, required number of wire closures and the longer transportation routes of the individual closures to the wiring machine. Thus, the wire closures will already have to be removed from the magazine and placed on the receiving units of an intermediate conveying member before the assigned bottle reaches the inlet of the wiring machine at all. Moreover, complicated and cumbersome transmissions of the signal produced at the inlet by the bottle to the controls of the mechanism which feeds closure elements onto the conveyor are unavoidable with an increasing size of the machine.

Electric controls are not very suitable, because of the electric lifting elements used in connection with them, the required switching frequencies for modern heavy-duty machines because of the forces required thereby. Also, the efficiency of the known putting-on arrangements, vis-a-vis variable running speeds in case of a greater control area, have placed some limits on a simple enlargement of the known arrangements.

Therefore, the invention is based on the object of creating a process for feeding closure members wherein the perforce enlarged distances between the bottle inlet and the closure-carrying magazine will no longer have a disturbing effect on a feed in case of rising hourly output and on the synchronization (of necessity made difficult by increased distances and output) between irregular intake of the bottles and putting-on of the individual wire closures.

Furthermore, it is an object to create an apparatus for feeding closure members, which apparatus is not burdened by the disadvantages of complicated and cumbersome transmissions of signals via kinematic-mechanical connections or of greater volumes of the filled lines in case of pneumatic controls, which disadvantages limit a great increase in the hourly output.

It is another object of the invention to provide an effective closure feeding system which establishes a continuous flow of closures and which utilizes a uniquely arranged sensing system to prevent multiple depositing on a conveyor receiver.

SUMMARY OF A PREFERRED EMBODIMENT OF THE INVENTION

The solution of the objects takes place, according to the invention, in the case of a process characterized in that the closures, which have been deposited onto the conveyors but have not been taken off because of bottles missing at the wiring station are returned on the intermediate conveying element to the depositing station of the magazine. Immediately prior to reaching the transfer point, such returned closures will trigger a signal preventing the delivery of another closure from the magazine.

It is clear from this solution that by avoiding a coupling of the bottle intake with the removal of wire closures from the magazine, one will be able to choose arbitrarily large distances between these two places, and that a freeing from the synchronization of these two processes will occur as well.

Starting out from a known arrangement, in case of which the closures that can be released individually from a locally fixed magazine rail, can be put on receivers of the intermediate conveying member by a transfer element equipped with a permanent magnet. A swivelably mounted arm, pressed resiliently against the surface of a control cam, is attached at the lower end of the magazine and extends radially in relation to a sprocket wheel of the intermediate conveying member. This arm has a locking hook which can be projected between the two foremost wire closures and which can be disengaged by the action of an irregular surface of the control cam, the latter being drivingly coupled with the sprocket wheel. A controllably disengageable stop of the foremost wire closure is disposed on a frame. The controls of the locking hook and of the stop are synchronized in such a way, that the stop can open only when the locking hook projects between foremost closure members. Care should be taken, for the feeding in of the two-support transfer element which grabs the closure elements, that the transfer element, for any arbitrary increase of the operating speed won't lose control of the closure elements of the depositing arrangement any place on their route. In other words, sections of the free drop which always existed in previous arrangements, should be precluded, so that the accelerations of the wire closure yokes, and thus the entire operating speed of the arrangement, could be considerably increased.

The characteristics utilized for this task are: that a roller-carrying lever, pressed by a spring, against a control curve, has been mounted swivelably on a bolt running tangentially to the sprocket wheel. For the feeding in of a two-support transfer member, a lever is provided which lever engages with the transfer member as the latter slides on a guide on the frame. The transfer member has two pistons carrying permanent magnets. The pistons are shiftable right through apertures in a break gap plate, whereby the break gap plate sits above the receivers of the intermediate conveying element at the depositing station.

In the path of the closure elements conveyed on the intermediate conveying element, a pneumatic sensor, determining the presence of a returned closure element is provided. Other sensors are provided, the nozzle jets of which are directed against cams or recesses of a step disc coupled with the sprocket wheel. The signal outlets of all sensors are connected to the inlets of an evaluating fluid control. The outlets of this control are connected to lifting elements, the first of which disengages the stop and the second of which releases the transfer element for movement.

Hitherto, with such a construction, chain speeds of the intermediate conveying element up to 0.8m/s have been achieved. Such speeds, even if the closing yokes contain only short, uncontrollable sections of the free drop, cannot possibly be achieved by prior known arrangements and indeed would lead to break downs after the shortest operation.

An effective development of fluid control, which despite high efficiency is very simple, has been characterized in the patent request and in the subsequent description of an embodiment by way of example it has been explained clearly.

DRAWINGS

In detail the drawing shows:

FIG. 1 a side elevational view of a closure depositing mechanism according to the invention;

FIG. 2 a top view of the arrangement of FIG. 1; and

FIG. 3 a diagrammatic illustration of connections of the fluid control.

DETAILED DESCRIPTION OF THE PREFERRED EMBODIMENT

Figure 1:
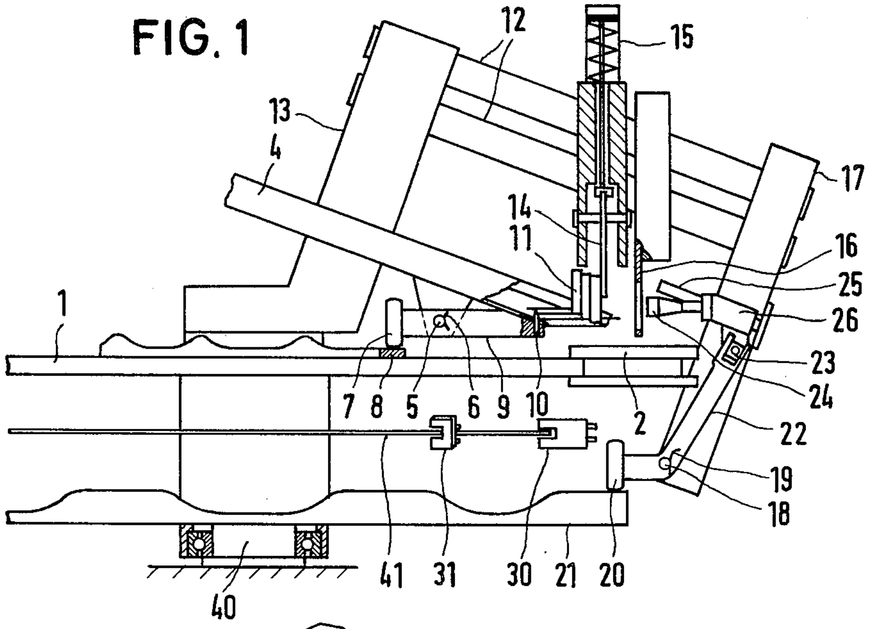
Figure 2:
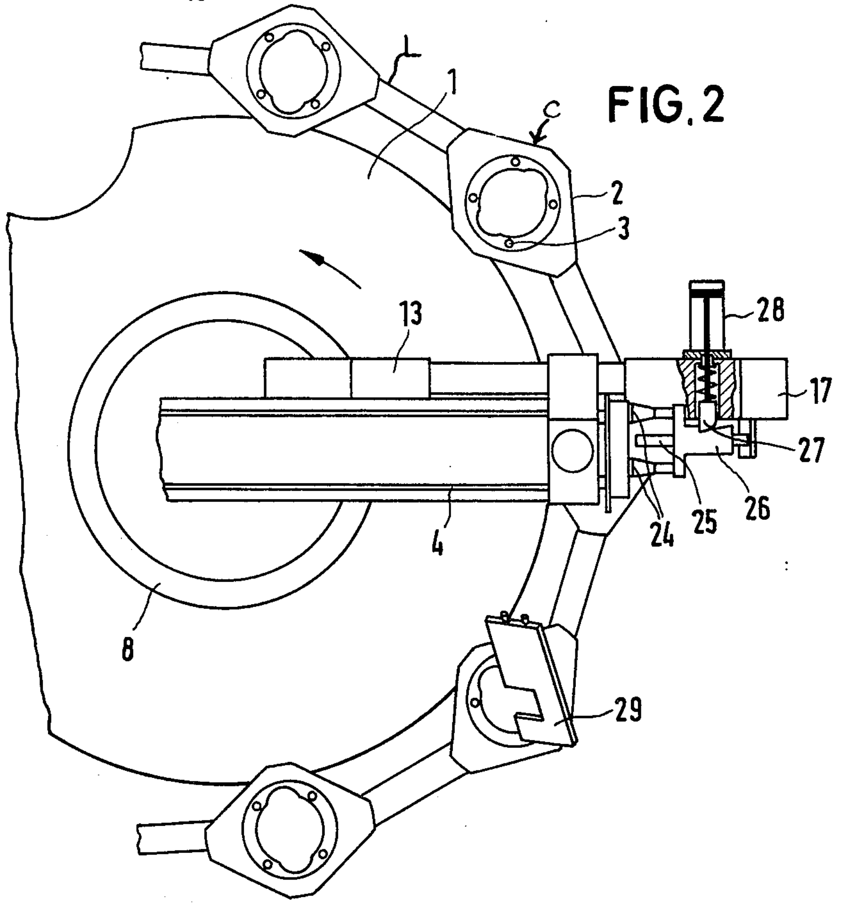
Figure 3:
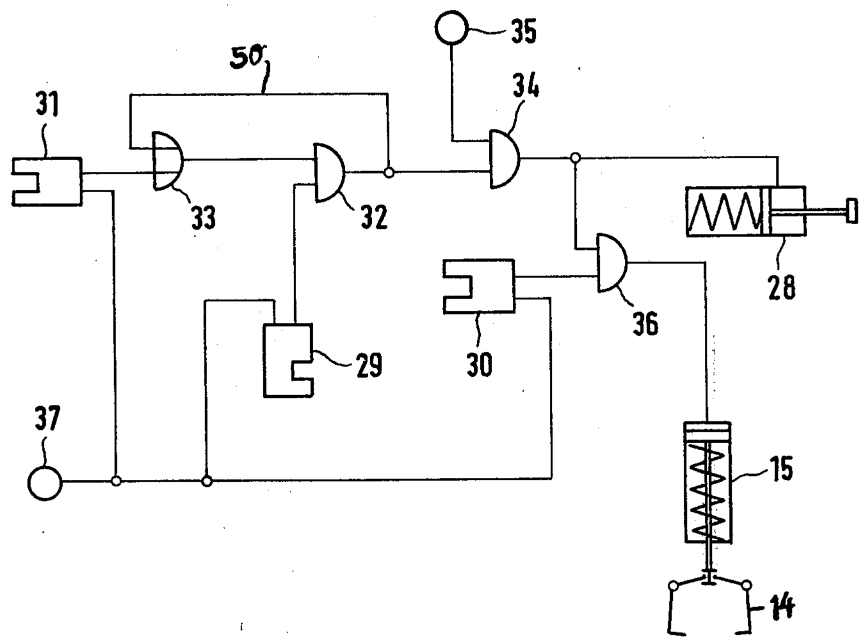

In FIGS. 1–3 there is depicted a feed mechanism for depositing closure elements 11 onto the receiving pads 2 of a conveyor. The conveyor transports the closure elements 11 to a bottle wiring machine (not shown). The bottle wiring machine is of the conventional type having means for sequentially removing the closure elements from the receivers 2 and installing them onto a bottle.

The feed mechanism includes a vertical and fixed column 40. Rotatably mounted on this column is an assembly which includes a sprocket wheel 1 having a control ring 8, a stepping disc 41, and a control cam 21. A conveyor device C comprises the receiving elements 2 connected by connecting levers L and is driven, for example, by the wiring machine in a conventional manner. The conveyor C is arranged so as to rotate the sprocket wheel 1, thereby rotating the members 8, 41, and 21 in the direction indicated by the arrow (FIG. 2). Above the sprocket wheel 1 there is firmly screwed onto the column 40, a stationary support 13. The support 13 includes a feed rail 4 running outwardly from the center and slantingly downwards and which receives yoke-like or hoop-like closures 11 lined up in a row between rods of the magazine.

A tong-shaped, disengageable lock or abutment 14 serves as a controlled stop for the foremost closure of the magazine bar. This abutment 14 and a break gap plate 16 are mounted on rails 12 of the support 13.

A holder 17 is connected to the rails 12. A lever 22 is pivoted on the holder 17, via a joint bolt 18 which extends generally tangentially relative to the sprocket wheel 1. This lever can be swivelled by the control cam plate 21 by way of a scanning roller 20. That is, a spring 19 biases the lever 22 so that the roller 20 of the lever engages the irregularly surfaced cam plate 21. As the cam plate rotates, depressions therein become aligned with the roller 20, allowing the spring 19 to swing the lever 22 counterclockwise as viewed in FIG. 1.

The upper lever end engages a sliding block 23, the latter engaging the transfer element 26. The transfer element is shiftably mounted on a guide 25 on the holder 17. The transfer element carries permanent magnets 24, which in their foremost position reach through apertures in the break gap plate 16 and seize the thigh of the next yoke closure 11. In the hindmost position of the transfer element, the permanent magnets are behind the break gap plate 16, and are held by a spring-loaded brake 27, the latter being disengageable by a pneumatic lifting element 28. The tong-shaped abutment 14 is also controllably disengageable by a pneumatic lifting element 15 (see FIG. 3).

An arm 9 is attached below the magazine rail 4 and is rotatable on a pivot pin 5. The arm 9 extends generally radially relative to the sprocket wheel 1. A projection 10 at the extreme end of the arm 9 extends between the foremost closure 11 in the magazine. In such a safety position, only the next closure element 11 can be removed from the magazine. The arm 9 has a scanning roller 7 which runs on an irregularly surfaced control ring 8 of the sprocke wheel 1 and is pressed against the latter by the action of a spring 6. The configuration of the control ring 8 is such as to swing the extreme end of the arm 9 into its safety position when the tong-shaped abutment 14 is disengaged, so that the entire row of closure elements of the magazine cannot slide out.

Operation of the closure depositing mechanism is preferably effected by a fluid circuit, depicted schematically in FIG. 3, although it will be realized that various other well-known mechanical and/or electrical systems for controlling sequentially movable elements could be easily utilized by one skilled in the art. The fluid circuit comprises well known sensing and activating devices which are uniquely arranged to provide advantageous operation in the present environment.

The fluid circuit includes a sensor 29 disposed above the conveyor at a location where receivers 2 must pass.

In rotary flow, there is located a sensing station S, one chain pitch before a receiver 2 of the conveyor reaches the location where closure elements are deposited. A nozzle jet of the pneumatic sensor 29, in this case an air barrier, scans without contact an area above this receiver 2. Consequently, any yoke closures possibly returning from the wiring machine on the receiver will be sensed. The sensor 29 is connected so as to conduct signal air from a source 37 to one inlet of a wall radiation element 32 connected and operating as an AND gate or function. The nozzle jet of sensor 29 can be interrupted only by the returning closure elements. In accordance with the sequential operation of the machine parts, this will occur only when the transfer element is in its hindmost position.

An additional air sensor 31 is provided which supplies air from the pressurized air source 37 to one inlet of an OR gate 33. The sensor 31 is arranged such that its air nozzles are directed against the stepping disc 41. In this manner, when peripheral recesses of the disc 41 are aligned with the air stream of the sensor 31, an air signal is supplied to one inlet of the OR gate 33. Alternately, when the stepping disc is advanced, a solid or nonrecessed peripheral part of the stepping disc 41 intersects the air stream of the sensor 31 and no signal is provided. Due to the grooved configuration of the stepping disc 41 and the correlated rotary movement of the stepping disc 41 and the conveyor, the sensor 31 emits an air signal to the OR gate 33 only when a receiver 2 is positioned below the sensor 29 for scanning.

Whenever the sensor 29 senses a closure element 11 on a receiver 2, no signal is supplied to the AND gate and the AND function on the inlet side of this gate 32 is not fulfilled. Consequently, the control signal will be missing on a series-connected amplifier 34, functioning as a valve, so that air flow from a pressurized source 35 is blocked. Thus, no unlocking air from the compressed air supply 35 is fed to the lifting element 28, which locks the transfer element. The brake 27 thus holds the transfer element 26 firmly in its rearward position.

In the case of such a state, the compressed air from source 35 is also missing at the inlet of another valve-functioning amplifier 36, so that even in case of a lasting control signal, no compressed air is supplied to the lifting element 15 for the tong-shaped abutment 14. The tong-shaped abutment thus remains in its closed state. Therefore, as the closure-carrying receiver advances from the sensing station toward a depositing station below the magazine, the rotary cam plate 21 rotates below the roller 20, but the lever 22 is held in a stationary position by the brake 27. Also, the abutment 14 retains the closures 11 in the magazine. As a result, no closure element is deposited onto the closure-carrying receiver.

If on the other hand, the sensor 29 in its function as an air barrier, does not scan any yoke closure on the incoming receiver, then the AND function is fulfilled. The two gates 32, 33 will store this state immediately by positive feedback of the starting signal from the AND gate 32 to the inlet of the OR gate 33. A control signal is thus fed to the amplifier 34 to admit pressurized air to release the brake 27. As a result, the transfer element 26, controlled by the control cam plate 31 can move forwardly right through the apertured break gap plate 16 to the foremost yoke closure. The transfer element in this forward position touches stops of the tong-shaped abutment 14.

As this occurs, the stepping disc 41 rotates until a recess is aligned with the air nozzles of the sensor 30. The sensor 30 then delivers a control signal to the amplifier 36. As a consequence of that, pressurized gas activates the lifting element 15, and the latter operates the tong-shaped abutment 14. The permanent magnets 24 of the transfer element 26 grab the yoke closure. Further rotation of the cam plate 21 causes the transfer element 26 to retract, thereby conveying the closure element. Immediately after that, the tong-shaped abutment 14 closes. Also, the end 10 of the arm 9 is pressed down by the control ring 8 so that the row of the yoke closures 11 in the magazine can slide against the tong-shaped lock. The end 10 is then immediately moved up to project between the two last wire closures.

During the retraction or backward movement of the transfer element 26 by the force of the spring 19 on the lever 22, the magnets 24 pass through the apertured break plate 16. The yoke closure, held on the permanent magnets 24, engages the break gap plate 16 and is separated therefrom immediately after engaging the permanent magnets 3, seated in the receiver 2 below. The yoke closure is thus removed from the magazine with an uninterrupted guidance and is transferred to the receiver.

Because of the continuous guidance of the yoke closures and with the help of the operating sequence, the operating speed can be increased considerably. The functional reliability of the entire installation can be increased, since the non-foreseeable contingencies of the closure free fall which in former installations again and again gave rise for irregularities, are eliminated.

OPERATION

The closure depositing mechanism functions to deposit closure elements 11 on the receivers 2 of the conveyor C and thus provides a continuous flow of closure elements toward a remote bottle wiring station. At the wiring station, where the closure elements and the bottles converge, there is continuously available a closure element for each bottle. There may occur instances, however, where there is no bottle available for wiring. In that event, the next available closure element on the conveyor will be passed up. When the closure-carrying receiver comes around again to the depositing station, it is necessary to insure that another closure will not be deposited thereon. Accordingly, the receiver passes below the fluid sensor 29 (FIG. 2) for scanning.

Taking first for consideration the situation normally encountered wherein there is no closure, it will be appreciated that when the receiver 2 is disposed below the sensor 29, the stepping disc 41 will present a recessed or open portion to the fluid stream of the sensor 31. Thus, the sensor will admit signal air from the source 37 to one inlet of the OR gate 33. This enables the signal to be advanced to one inlet of the AND gate 32 since only one signal is required to activate an OR gate. Since there is no interruption to the signal air stream of the sensor 29 (i.e., there is no closure element on the receiver 2 being scanned) this signal air stream (also from source 37) will be admitted to the other inlet of the AND gate 32. Since two signals are required to "unlock" the AND gate, the air signals from sensors 31 and 29 unlock this gate and a signal is supplied to the amplifier 34 to admit pressurized air from the source 35 to the unlocking device 28 of the brake 27.

Signal air from the AND gate 32 is fed back to the other inlet of the OR gate 33 through conduit 50. As a result, subsequent movement of the stepping disc 41 which terminates the signal from the sensor 31 will not terminate the signal to the amplifier 34, since the signal air from conduit 40 is sufficient to keep the OR gate open. Air thus passes from the conduit 40, through the OR gate 33, and to and through the AND gate 32 to keep the amplifier 34 open.

This condition continues until the signal from sensor 29 stops (as by detecting a closure on a receiver).

With the brake 27 unlocked, further movement of the conveyor C and the cam plate 21 causes the lever 22 to shift the transport element 26 toward the foremost closure element 11 as the receiver approaches the deposit station. During this time the stepping disc 41 is rotated such that a recessed portion thereof enables the sensor 30 to supply an air signal to the amplifier 36. Since pressurized air continues to be furnished from the source 35 (due to the continued activation of the amplifier 34 by the sensor 29), activation of the amplifier 36 enables pressurized air to be supplied to the lifting element 15 to release the abutment 14. The foremost closure element is then attracted to and captured by the magnets 24. Remaining closure elements are restrained by the end 10 of the arm 9. As the receiver 2 moves into position at the depositing station, the transport element 26, under the influence of the cam plate 21, retracts through the apertures in the break plate 16. The closure element being carried by the transport element 26 cannot pass through the break plate 16, is separated therefrom, and drops onto the receiver 2.

In the event that a closure element is seated on the receiver 2 at the sensing station, no signal air stream is supplied to the AND gate and sensor 29 when the signal from the sensor 31 is supplied. Hence the AND gate is never opened and no compressed air can be supplied to either of the unlocking devices 28 and 15 during the next stage of operation wherein the closure-carrying receiver 2 travels to the depositing station. As a result, no closure element is dropped from the magazine.

SUMMARY OF MAJOR ADVANTAGES AND SCOPE OF THE INVENTION

The closure depositing mechanism according to the invention makes possible the use of the unique process of the invention and eliminates the disadvantages mentioned by means of a special concept and a special kind of control. It functions largely independently of the running speed, i.e., from the variable output of the bottle wiring machine. The yoke closures are under forced control, i.e., during the depositing process they are constantly under control. They touch the surfaces of permanent magnets and are exposed to forces from their magnetic fields. At the same time the permanent magnets follow kinematically precisely prescribed paths, so that the movement of the yoke closures in the space is also defined exactly. Effectively disposed stops ensure not only a reliable separation of the two yoke closures immediately before the depositing, but also the release of the foremost yoke closure from the feed rail of the magazine to the permanent magnets. Contrary to known embodiments, the control signals are not triggered by incoming bottles but by unused yoke closures returning in a cycle to the depositing station. In other words, the receivers are continuously loaded with yoke closures, until a yoke closure not received in the wiring machine returns. It is scanned at a distance of one chain pitch before the depositing station. Whenever a yoke closure returns, a corresponding control signal is triggered, is evaluated in a fluid control, and the depositing process is interrupted. This principle permits the installation of the sensors and fluid control needed thereto immediately adjacent to the putting-on arrangement. The transmission of the signals across short distances, the use of rapidly reacting fluid gates for storage of signals and small quantities of fillers in the high pressure area fulfill the conditions which are required to achieve short operating times during scanning of the yoke closures at a high operating frequency of the lifting elements. The pneumatic lifting elements dispose of sufficiently great forces and ensure as a result a reliable functioning, even with filled magazines and as a result fully loaded locking elements.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Apparatus for supplying wire closure elements for bottles comprising:

a magazine carrying a row of closure elements at a depositing station;

an endless conveyor traveling adjacent said magazine and having receivers for carrying closure elements from said depositing station toward a bottle wiring station;

a sprocket wheel driven by said conveyor;

a control cam plate rotatably driven by said sprocket wheel and having an irregular surface;

a support;

a lever to said support on a pivot extending generally tangentially to said sprocket wheel;

a guide carried by said support;

a transfer element slidably mounted on said guide, said transfer element being connected to said lever and including a pair of pistonlike portions each of which carry a permanent magnet;

a roller carried by said lever;

spring means biasing said roller against said irregular surface of said cam plate such that rotation of said cam plate causes said transfer element to be shifted toward and away from said closure elements;

locking means operable to prevent shifting of said transfer element toward said closure elements;

first release means for retracting said locking means;

abutment means mounted on said support for movement toward and away from a position in front of said row of closure elements to prevent discharge of closure elements;

second release means for retracting said abutment means;

a hook arm pivotally mounted at said magazine and extending generally radially relative to said sprocket wheel, said arm having:

a first end pressed resiliently against an irregular surface of said sprocket wheel such that said arm is rotated in a predetermined manner in response to rotation of said sprocket wheel, and a stop end movable between a stop position between the two foremost closure elements of said row of closure elements to allow removal of only one closure element at a time from said magazine, and a release position wherein forward advancement of said row of closures is permitted;

a break gap plate located in the path of travel of said transfer element and disposed above a point where said conveyor receivers arrive;

said break gap plate including an aperture sized to allow passage of said permanent magnets while preventing passage of a closure element carried by said magnets;

fluid circuit sensing means for determining the presence of a yoke closure on a receiver at a sensing station ahead of said depositing station to prevent the depositing of a closure element onto said closure carrying receiver at said depositing station; said sensing means comprising:

a first fluid sensor at said sensing station arranged in the path of a yoke closure which may be carried on said receivers, to detect the presence of such a closure and emit a signal in response thereto, a rotary stepping disc rotatably mounted and driven for rotation in synchronous relation with said sprocket wheel and said cam plate;

said stepping disc including recessed portions;

second and third fluid sensors arranged to sense said recessed portions and emit a signal in response thereto;

said first, second, and third sensors being operably connected to fluid control means for regulating the supply of actuating fluid to said first and second release means to sequentially retract said locking means and said abutment means to allow a closure element to be deposited onto a receiver only when there is no closure element on said receiver.

2. Apparatus according to claim 1 wherein said fluid control means comprises an air-actuated AND gate, and an air-actuated OR gate; the outlet of said first sensor being connected to one inlet of said AND gate; the outlet of said OR gate being connected to another inlet of said AND gate; the outlet of said second sensor being connected to an inlet of said OR gate; the outlet of said AND gate being connected with a first gate amplifier for controlling the admittance of compressed air from a supply source thereof to said first release means and to said second release means; and a second gate amplifier connected to the output of said third sensor for admitting compressed air to said second release means.

* * * * *